US008191465B2

(12) United States Patent
Sager et al.

(10) Patent No.: US 8,191,465 B2
(45) Date of Patent: Jun. 5, 2012

(54) COOKING OVEN CONTROL SYSTEM AND RELATED METHODS

(75) Inventors: David D. Sager, Troy, OH (US); Sebastien R. Delbos, Mere (FR); Michel G. Foray, Passenans (FR)

(73) Assignee: Premark FEG L.L.C., Wilmington, DE (US)

( * ) Notice: Subject to any disclaimer, the term of this patent is extended or adjusted under 35 U.S.C. 154(b) by 1105 days.

(21) Appl. No.: 12/056,967

(22) Filed: Mar. 27, 2008

(65) Prior Publication Data

US 2008/0236562 A1 Oct. 2, 2008

Related U.S. Application Data

(60) Provisional application No. 60/908,201, filed on Mar. 27, 2007.

(51) Int. Cl.
*A23L 27/00* (2006.01)

(52) U.S. Cl. .......................................... 99/332; 219/682

(58) Field of Classification Search .................... 99/332; 219/680–682

See application file for complete search history.

(56) References Cited

U.S. PATENT DOCUMENTS

| | | | | |
|---|---|---|---|---|
| 4,323,773 | A | 4/1982 | Carpenter | |
| 4,345,132 | A | 8/1982 | Takase et al. | |
| 4,375,586 | A | 3/1983 | Ueda | |
| 4,626,662 | A | 12/1986 | Woolf | |
| 4,780,588 | A | 10/1988 | Edamura | |
| 4,816,635 | A | 3/1989 | Edamura | |
| 4,837,414 | A * | 6/1989 | Edamula | 219/714 |
| 4,968,864 | A | 11/1990 | Doi et al. | |
| 5,015,826 | A | 5/1991 | Curti | |
| 5,285,041 | A | 2/1994 | Wright | |
| 5,321,229 | A | 6/1994 | Holling et al. | |
| 5,321,232 | A | 6/1994 | Ogle | |
| 5,333,146 | A | 7/1994 | Vance | |
| 5,349,162 | A | 9/1994 | Holling | |
| 5,377,582 | A | 1/1995 | Nersesiam | |
| 5,378,874 | A | 1/1995 | Holling et al. | |
| 5,426,280 | A | 6/1995 | Smith | |
| 5,504,311 | A | 4/1996 | DuBuis et al. | |
| 5,611,327 | A | 3/1997 | Teixeira Filho et al. | |
| 5,709,142 | A | 1/1998 | Nersesian | |
| 5,710,409 | A | 1/1998 | Schwarzbäcker et al. | |
| 5,829,341 | A | 11/1998 | Lin | |
| 5,938,966 | A | 8/1999 | Oh et al. | |
| 6,043,461 | A | 3/2000 | Holling et al. | |

(Continued)

FOREIGN PATENT DOCUMENTS

CN 1262414 A 8/2000

(Continued)

OTHER PUBLICATIONS

Invitation to Pay Additional Fees with Partial International Search, PCT/US2008/058339 (Feb. 2, 2009).

(Continued)

*Primary Examiner* — Stephen L. Blau
(74) *Attorney, Agent, or Firm* — Thompson Hine LLP

(57) ABSTRACT

An oven includes a scanning mechanism that facilitates cooking food items according to cooking recipes/programs associated with the food items. The oven may include a Bluetooth link to facilitate receipt of cooking programs and other information, as well as export of data.

19 Claims, 6 Drawing Sheets

U.S. PATENT DOCUMENTS

| | | | | |
|---|---|---|---|---|
| 6,080,972 | A | 6/2000 | May | |
| 6,100,509 | A | 8/2000 | Saito | |
| 6,112,246 | A | 8/2000 | Horbal et al. | |
| 6,121,593 | A | 9/2000 | Mansbery et al. | |
| 6,124,583 | A * | 9/2000 | Bowers | 219/714 |
| 6,137,095 | A | 10/2000 | Kashimoto et al. | |
| 6,243,772 | B1 | 6/2001 | Ghori et al. | |
| 6,244,165 | B1 | 6/2001 | Trombley et al. | |
| 6,283,014 | B1 | 9/2001 | Ng et al. | |
| 6,325,290 | B1 | 12/2001 | Walter et al. | |
| 6,346,692 | B1 | 2/2002 | Ubowski et al. | |
| 6,359,270 | B1 * | 3/2002 | Bridson | 219/679 |
| 6,444,965 | B1 | 9/2002 | Ha et al. | |
| 6,549,818 | B1 | 4/2003 | Ali | |
| 6,550,681 | B1 | 4/2003 | Ross et al. | |
| 6,552,309 | B1 | 4/2003 | Kish et al. | |
| 6,698,657 | B2 | 3/2004 | Murphy et al. | |
| 6,774,345 | B1 | 8/2004 | Kenk | |
| 6,809,301 | B1 * | 10/2004 | McIntyre et al. | 219/506 |
| 6,826,267 | B2 * | 11/2004 | Daum et al. | 379/102.03 |
| 6,862,494 | B2 | 3/2005 | Hu et al. | |
| 6,938,002 | B2 | 8/2005 | Moskowitz et al. | |
| 6,962,290 | B2 | 11/2005 | Kwon et al. | |
| 7,069,091 | B2 * | 6/2006 | Williamson | 700/90 |
| 7,092,988 | B1 | 8/2006 | Bogatin et al. | |
| 7,133,739 | B2 | 11/2006 | Williamson et al. | |
| 7,151,968 | B2 | 12/2006 | Williamson | |
| 2004/0134903 | A1 | 7/2004 | Chun | |
| 2006/0043190 | A1 * | 3/2006 | Jeon | 235/462.13 |
| 2006/0278710 | A1 * | 12/2006 | Park et al. | 235/462.15 |

FOREIGN PATENT DOCUMENTS

| | | |
|---|---|---|
| CN | 1900858 | 1/2007 |
| DE | 102005040206 | 2/2007 |
| EP | 971175 | 1/2000 |
| EP | 971176 | 12/2000 |
| EP | 1746350 | 1/2007 |
| WO | 00/49838 | 8/2000 |
| WO | 03/038721 | 5/2003 |

OTHER PUBLICATIONS

International Search Report and Written Opinion, PCT/US2008/058339 (Apr. 17, 2009).

International Preliminary Report on Patentability, PCT/US2008/058339 (Oct. 8, 2009).

* cited by examiner

COOKING OVEN CONTROL SYSTEM AND RELATED METHODS

CROSS-REFERENCES

This application claims the benefit of U.S. provisional application Ser. No. 60/908,201, filed Mar. 27, 2007, the entirety of which is incorporated herein by reference.

TECHNICAL FIELD

This application relates generally to (i) control systems for combination ovens and (ii) communication systems for ovens and other food equipment.

BACKGROUND

In combination ovens more than one heat transfer process is typically available for use in cooking food products, providing advantages such as decreasing cooking time, improvement in the taste, texture, moisture content or the visual, appeal of the cooked foodstuff and/or enabling greater versatility with a single cooking unit. Combination ovens may include multiple cooking sources such as radiant, convection, steam and/or microwave, or in some cases multiple mechanisms that enable control of more than one cooking factor of an oven chamber. Combination ovens also often include a recipe program feature that enables a user to select and implement a specific pre-stored recipe for a cooking operation, where the recipe may include one or more phases and relates temperatures, times, power levels etc.

It would be desirable to provide improved techniques for (i) selecting and implementing given recipes, (ii) making recipes available for oven users, (iii) associating recipes with specific food products and (iv) communicating with food product ovens and other food equipment more generally.

SUMMARY

In one aspect, an oven includes a cooking chamber with at least one associated cooking source, a user interface, a scanning mechanism for scanning product codes associated with food products to be cooked, and a controller for receiving scanned product code information and connected for (i) receiving input from the user interface and (ii) controlling operation of the cooking source. In a cook ready mode the controller operates such that upon receiving a scanned product code the controller: (a) implements a cook preparation sequence associated with the scanned product code, including operating the cooking source to prepare the cooking chamber for cooking and setting a timer to a duration associated with the scanned product code; and (b) maintains the oven in a ready state, without initiating countdown of the timer, until a start cooking input is received via user actuation of a portion of the user interface.

In one or more implementations, the scanning mechanism is a bar code scanning mechanism and wherein the scanned product code information includes cook program details therein. In one or more implementations, in the cook ready mode the controller operates such that upon receiving the scanned product code the controller identifies a stored cooking program associated with the scanned product code and implements the cook preparation sequence for the identified cooking program.

In another aspect, an oven includes a cooking chamber with at least one associated cooking source, a user interface, a scanning mechanism for scanning product codes associated with food products to be cooked and a controller for receiving scanned product code information and connected for (i) receiving input from the user interface and (ii) controlling operation of the cooking source. In a cook ready mode the controller operates such that upon receiving a scanned product code the controller identifies a stored cooking program associated with the scanned product code. In a cooking program input/modify mode selectable via the user interface, the controller operates such that: (i) a program link selection for a specific cooking program can be activated by a user; (ii) upon user activation of the program link selection the controller initiates a timeout operation; (iii) upon receipt of a scanned product code prior to completion of the timeout operation, the scanned product code is linked, in memory of the controller, to the specific cooking program; and (iv) upon receipt of a scanned product code after completion of the timeout operation, the scanned product code is not linked to the specific cooking program.

In a further aspect, a method of communicating oven cooking programs to an oven involves the steps of: storing multiple cooking programs in a file with a binary format; uploading the binary file to a portable hand-held device including Bluetooth communication capability; utilizing the hand-held device, selecting the binary file for transfer to an oven having Bluetooth communication capability; transferring the binary file to the oven via the Bluetooth communication link between the oven and the hand-held device.

In still another aspect, a method of retrieving information from a food equipment device involves the steps of: configuring an information request as a binary file; uploading the binary file to a portable hand-held device including Bluetooth communication capability; utilizing the hand-held device, selecting the binary file for transfer to the food equipment device, wherein the food equipment device has Bluetooth communication capability; transferring the binary file to the food equipment device via the Bluetooth communication link between the food equipment device and the hand-held device; the food equipment device includes a controller and responsive to receipt of the binary file the controller identifies the information request and transfers the information in a text file format to the hand-held device via the Bluetooth communication link.

DETAILED DESCRIPTION

An exemplary combination oven is shown and described in U.S. Patent Publication No. 2006-0054155 the details of which are incorporated herein by reference.

Figure 1:
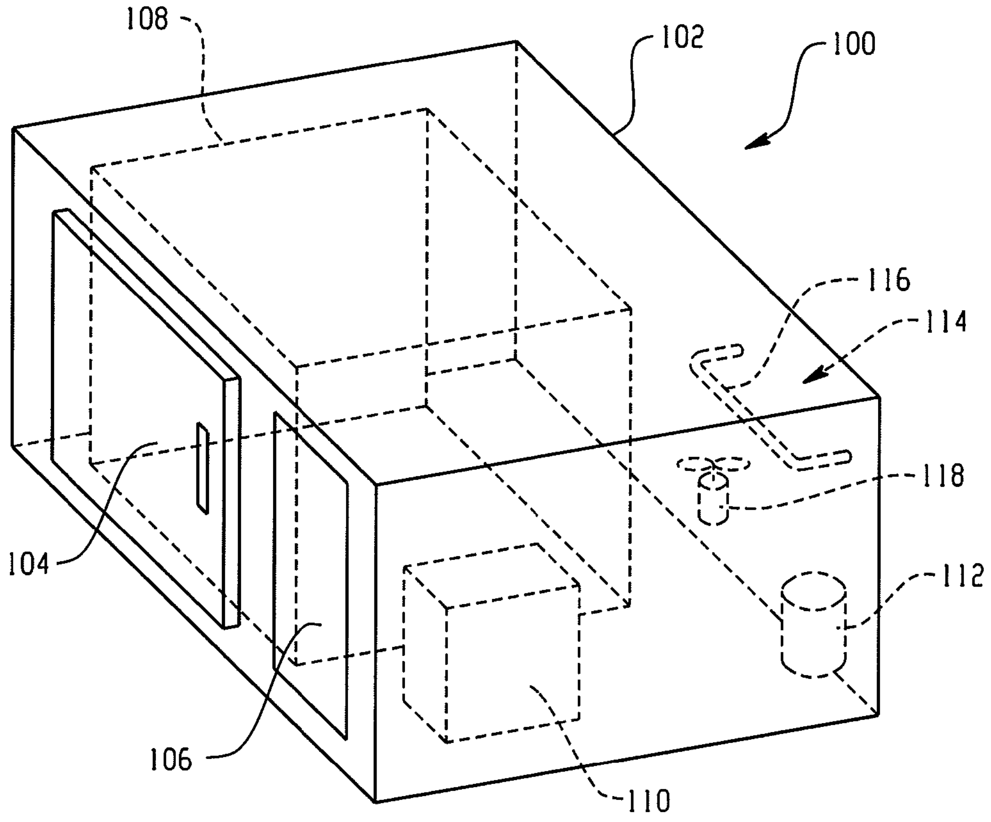
FIG. 1 depicts an exemplary oven.

Generally, referring to FIG. 1, a combination oven 100 is shown including an external housing 102, oven door 104 and a user interface control panel 106. Internal to the housing a cooking cavity 108 is defined. The oven includes an associated steam generator (e.g., an electric or gas boiler) 110 plumbed for controlled delivery of steam to the cavity 108.

The steam generator 110 may be incorporated within the primary housing 102 as shown, or could be a separate unit connected with the primary housing 102. A microwave generator 112 produces microwave radiation that is delivered to the oven cavity 108 via a suitable path as may be defined utilizing waveguides. A convection heating source 114 may be formed by an electric or gaseous heating element 116 in association with one or more blowers 118, with suitable delivery and return airflow paths to and from the cavity 108. The exact configuration and number and type of cooking sources of the oven could vary. For example, the oven shown and described in U.S. Patent Publication No. 2006-0054155 lacks a microwave cooking source. Moreover, the source for humidity/steam generation could more simply be a source of water that is delivered into the cooking chamber for conversion to steam by a convection cooking source, as taught in U.S. Patent Publication No. 2006-0054155.

Figure 2:
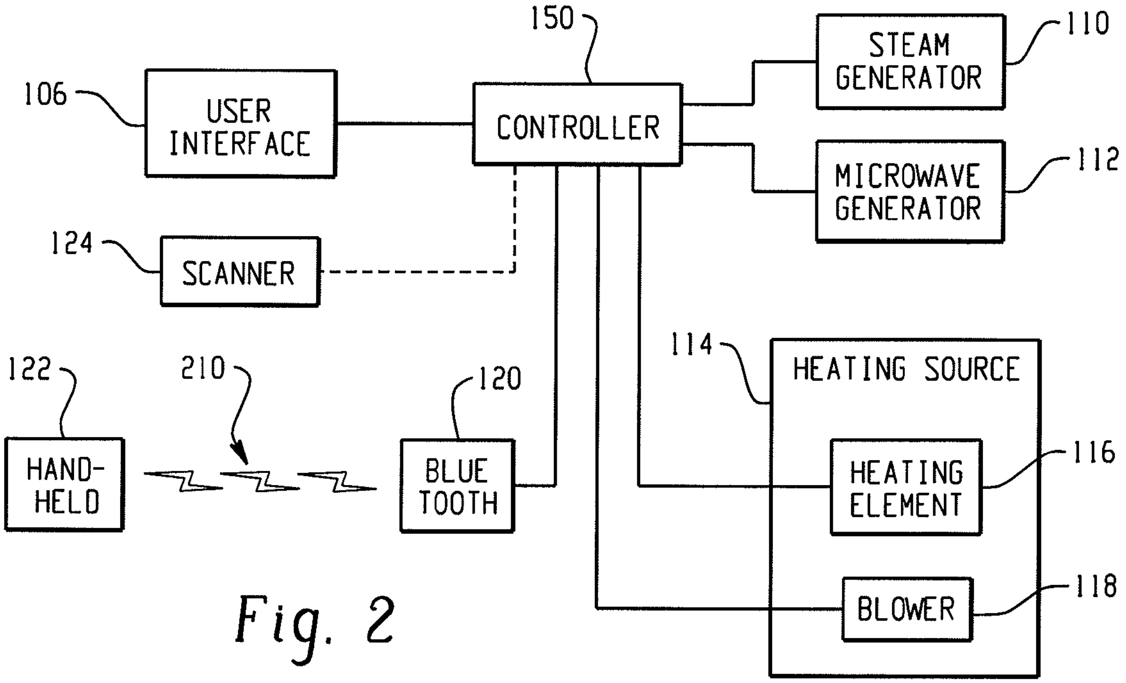
FIG. 2 depicts a control system of the exemplary oven.

A basic control schematic for the oven 100 is shown in FIG. 2, utilizing a controller 150 in association with the user interface 106, steam generator 110, microwave generator 112, and convection heating source 114. The controller 150 can be programmed and/or configured to operate as described herein. In one example, the controller 150 includes an associated Bluetooth communication function 120 (e.g., provided by a Bluetooth communication board) for communicating with external devices such as portable hand-held device 122, which by way of example could be a cell phone, PDA device or even a portable laptop computer. Other wireless personal area network technologies could also be used. Also shown in the example of FIG. 2 is a scanner mechanism 124 which may be provided for facilitating certain input to the oven controller 150. In one implementation, the scanner may be hard-wired directly to the controller and mounted in a tethered manner on a side of the oven. In another possible implementation the scanner 124 may be mounted in a fixed manner to the oven (e.g., with scanning head protruding from the oven or with scanning head behind a window provided on the housing of the oven). In yet another possible implementation the scanner 124 may communicate wirelessly to the oven or may be Bluetooth compatible for communicating data to the controller via the Bluetooth communication path.

The scanner 124 may be a bar code scanner for scanning UPC bar codes commonly provided on food item packages. EAN, Delta matrix and other types of bar codes could be scanned as well. In another implementation the scanner 124 may be and RFID scanner for scanning RFID tags or elements included on food product packages.

Figure 3:
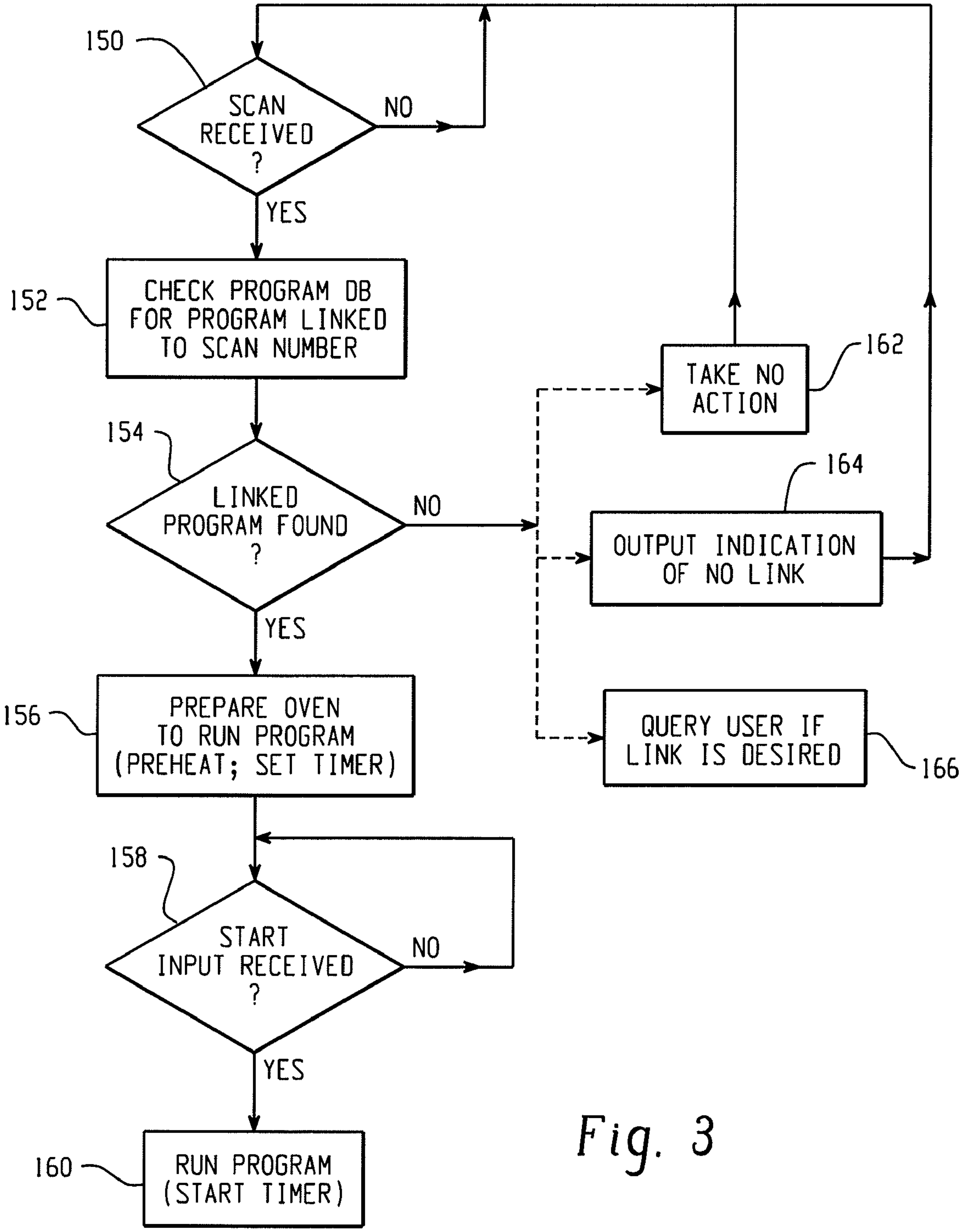
FIG. 3 is a high level function diagram of the oven.

In one embodiment, the controller 150 includes memory storing multiple possible cooking programs for the oven 100. The user may utilize the user interface 106 to select and implement a given stored cooking program. Alternatively, the user may utilize the scanner 124 to select and implement a stored cooking program. Specifically, and referring to the high level functional operation shown in FIG. 3, the controller waits for receipt of scanned code information (e.g., product number scanned from a bar code of RFID tag) at step 150 and upon receipt checks its program database at step 152 and 154 to determine if a stored cooking recipe/program is linked to the scanned code information. If so, the controller operates at step 156 to prepare the oven to run the identified program (e.g., operating at least one source to preheat the oven to a temperature specified in the identified program and setting the timer to time specified in the identified program). Upon identification of the linked program the controller may also display program information on a display of the user interface and provide an audible output to alert the user that a linked program has been found. At step 156, timer countdown is not started. Instead, the oven waits at step 158 to receive a start input from the user interface (e.g., user activation of a start switch/button after placement of a food product in the cooking chamber). Upon receipt of the start input the controller runs the identified cooking program (which may have a single phase or multiple phases and which may utilize a single cooking source or multiple cooking sources) and the timer countdown is started at step 160.

Once the program begins running at step 160, the controller may include a lockout feature that causes it to ignore scanned product information received while another program is already running. A similar lockout could be included for a cleaning process being carried out by the oven controller. In one implementation, if a subsequent scanned product code is received during wait step 158, the controller may be configured to automatically proceed with steps 152, 154 and 156 for the subsequent scanned product code. In another implementation, during step 156 and wait step 158 the controller could ignore any subsequent bar code scans, and a user interface button must be pressed to return to step 150 without completing the identified cooking program.

If the scanned product code received at step 150 is not linked with a stored program, the controller may respond by simply ignoring the code and returning to step 150 (e.g., path 162). In another implementation, the controller may effect output a message (visual and/or audible) advising the user that no corresponding stored program was found (e.g., path 164). In yet another implementation, the controller may effect output of a query to determine if the user desires to link the scanned product code with an existing stored recipe/program (e.g., path 166).

Figure 4:
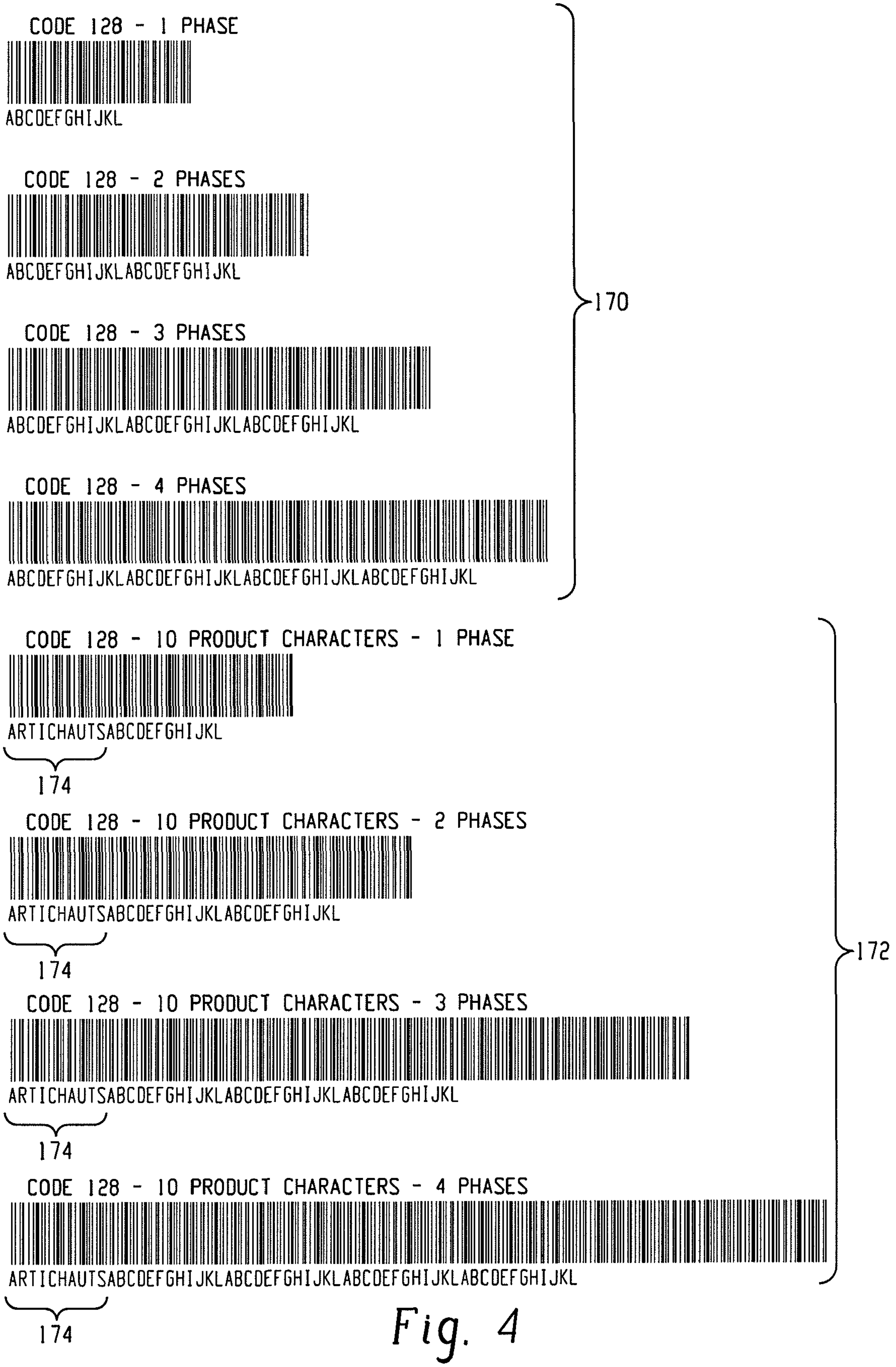
FIG. 4 depicts exemplary bar codes incorporating oven cooking programs.

In another embodiment, the scanned code may embody the cooking program/recipe itself (e.g., cook modes, temperatures/powers and durations) such that the controller does not need to carry out a check of its stored program database. By way of example, reference is made to the exemplary bar codes shown in FIG. 4 that reflect the manner in which 1 Phase, 2 Phase, 3 Phase and 4 Phase cooking programs may be embodied in Code 128 bar code symbology. Bar codes 170 lack any program name, while bar codes 172 include a program name 174.

Figure 5:
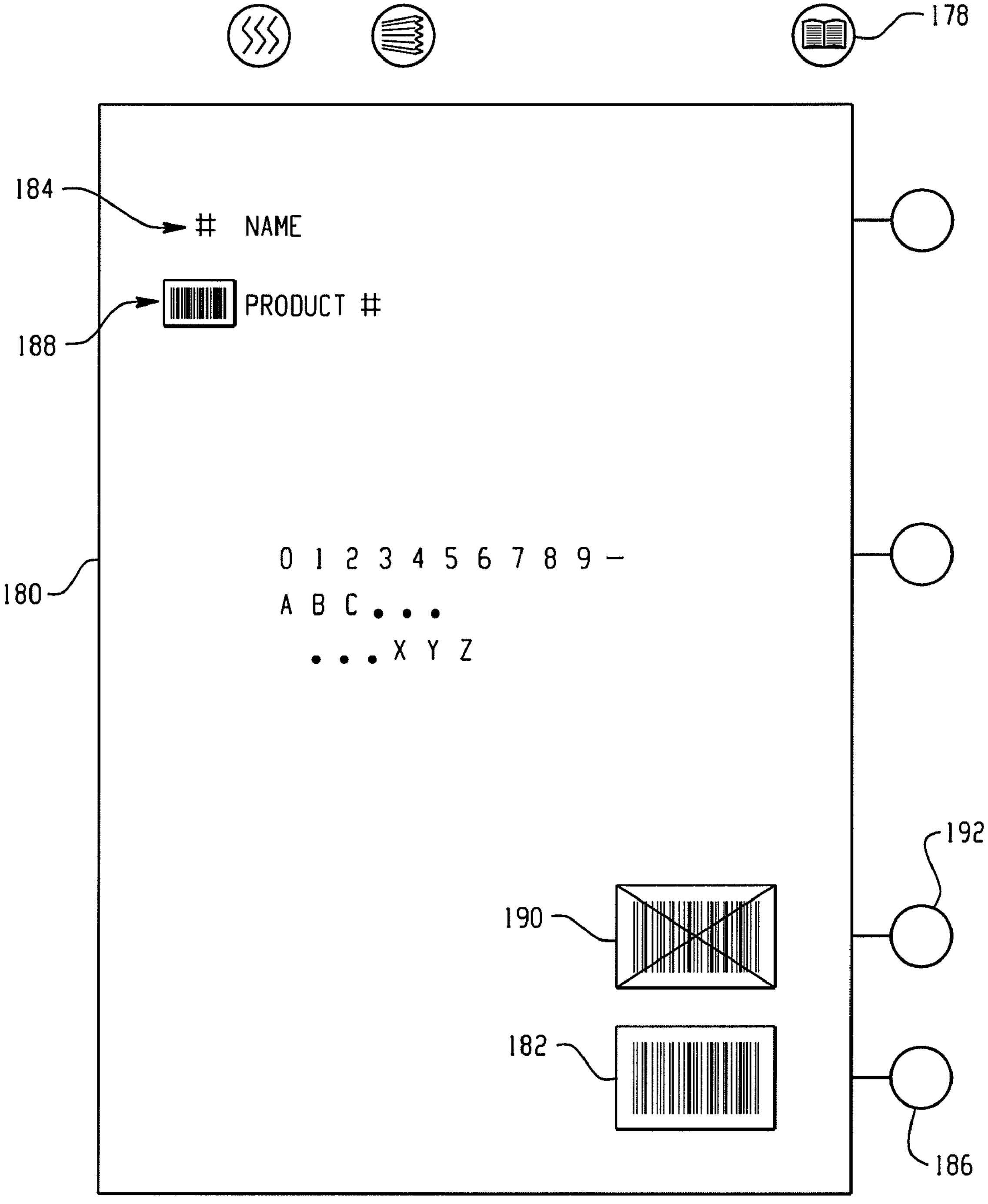
FIG. 5 depicts an exemplary interface display of the oven.

Referring to FIG. 5, the oven may include a cooking program input/modify mode (e.g., user selectable via the interface switch/button 178) in which the controller operates such that a display screen 180 of the user interface displays at least a program link icon 182 in association with a specific cooking program (e.g., identified in the displayed program name line 184). Upon user selection of the program link icon (e.g., by pressing the button/switch 186 located beside the display 180) the controller initiates a timeout operation. In one embodiment, the timeout may be between 5 and 15 seconds (e.g., about 10 seconds). If the controller receives a scanned product bar code prior to completion of the timeout operation, the scanned product bar code is linked, in memory of the controller, to the specific cooking program and the scanned product number (e.g., bar code number) may be displayed in the bar code number line 188. However, if the controller receives a scanned product bar code after completion of the timeout operation, the scanned product bar code is not linked to the specific cooking program.

As shown in FIG. 5, in the cooking program input/modify mode the controller may also operates such that the display 180 of the user interface further displays a program unlink icon 190 in association with the specific cooking program. Upon user selection of the program unlink icon (e.g., by pressing the button/switch 192 located beside the display 180 for at least a certain time period (e.g., 2-4 seconds)) an existing link between a scanned product bar code and the specific cooking program is eliminated, in which case the display of the product number at line 188 would be eliminated.

Figure 6:
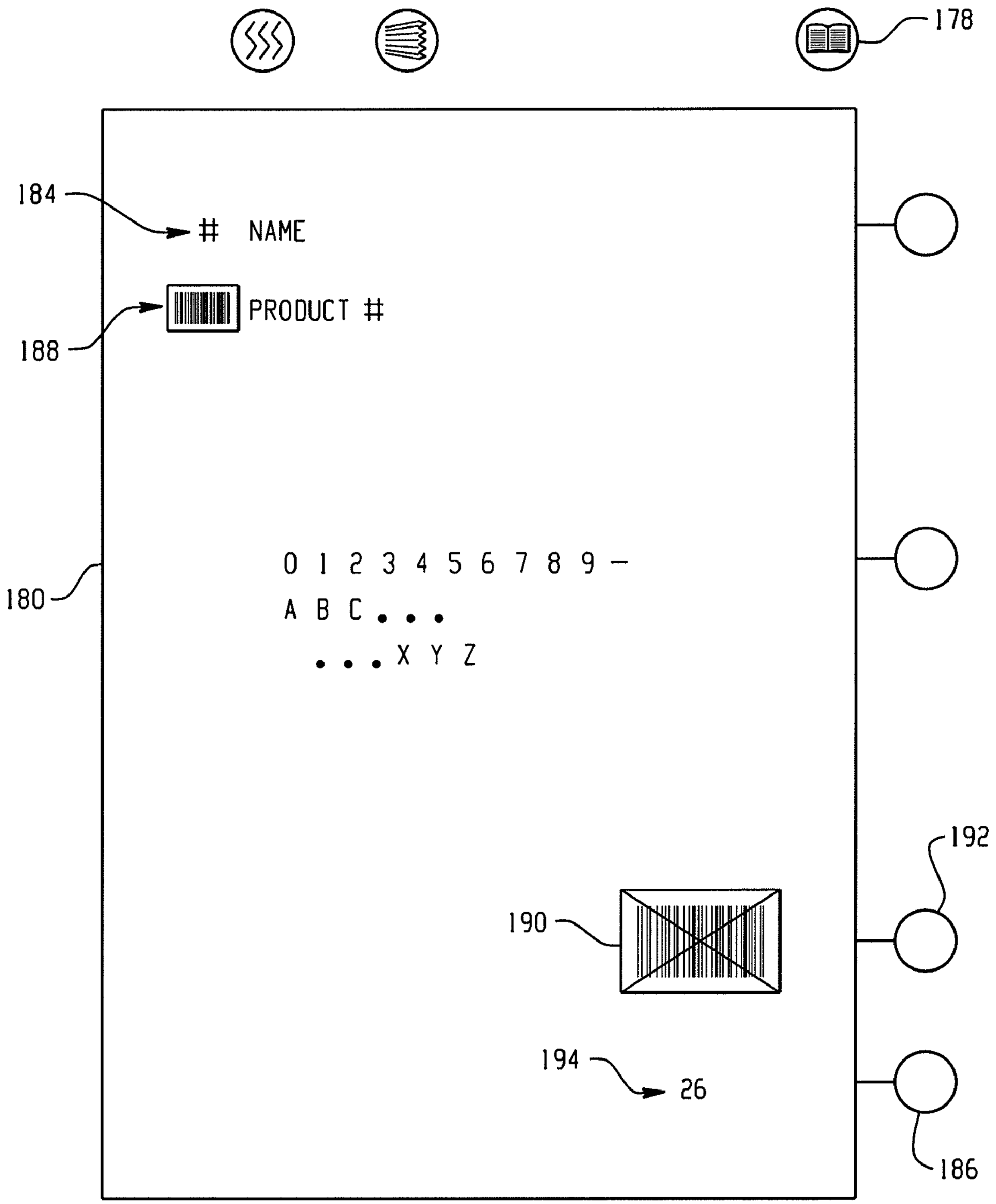
FIG. 6 depicts another exemplary interface display of the oven.

FIG. 6 shows that in the cooking program input/modify mode the controller may also operate such that if the scanned product bar code received (subsequent to selection of link icon 182) is already linked with another stored cooking program, the controller operates such that an identifier 194 of the other stored cooking program (e.g., program number and/or program name) is displayed and the scanned product bar code is not linked to the specific cooking program. However, the controller may provide the identifier display 194 for a specified time period and, if the user selects the identifier (e.g., by pressing switch/button 186) the controller may eliminate the existing link between the scanned product code and the other program and create a new link between the scanned product code and the specific program being displayed.

Figure 7:
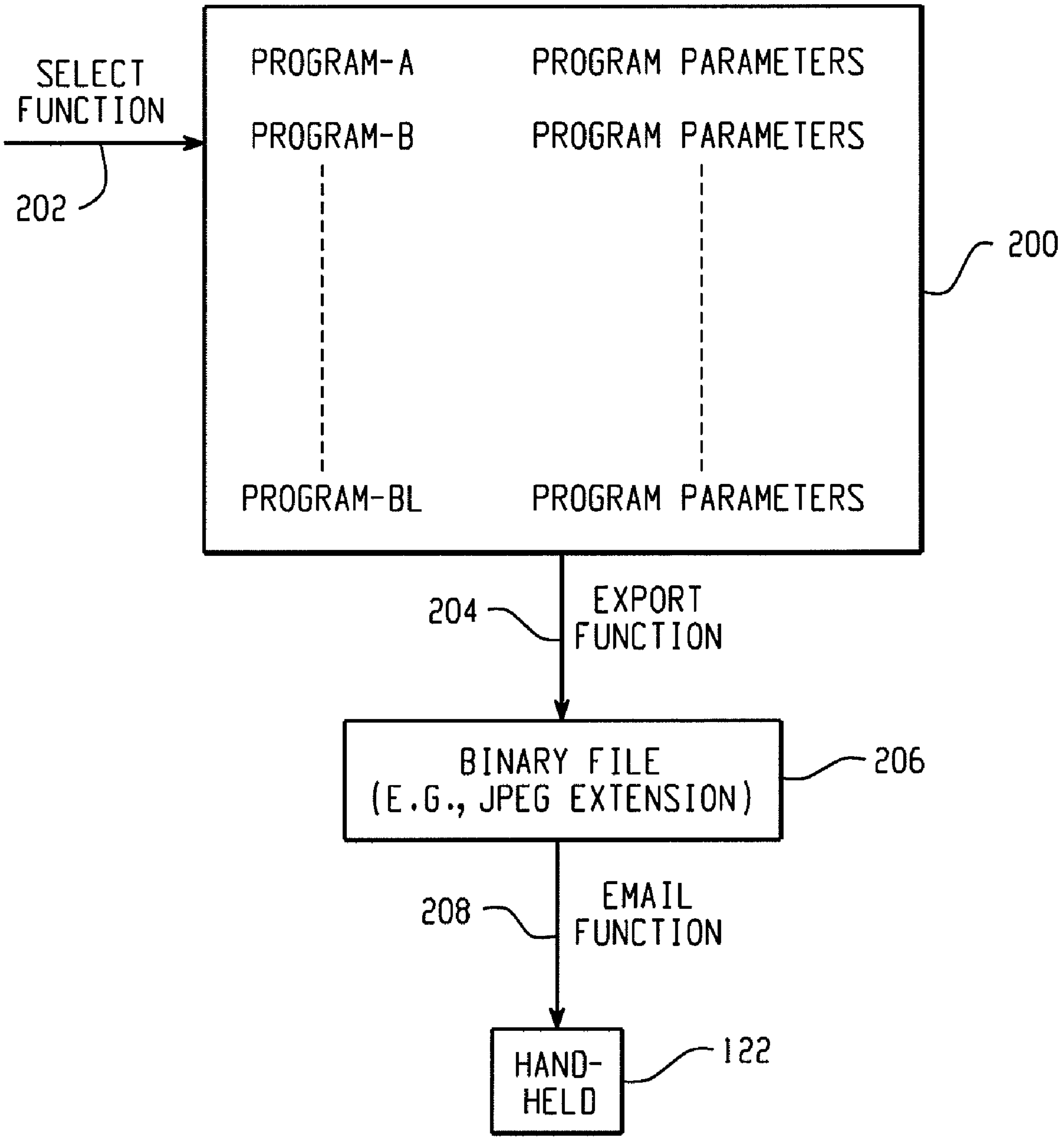
FIG. 7 depicts a portion of a functional process for loading cooking programs to an oven.

Referring now to FIG. 7, a advantageous technique for loading cooking programs into the oven is now described. As shown in FIG. 7, a database of cooking programs may be stored in a computer system (e.g., an oven manufacturer's computer system), with an on-screen interface 200 provided enabling a user to view and select from among the programs using a select function 202. The computer system includes an export function 204 that causes any selected cooking programs to be exported from the database and saved in a binary file 206 with a picture file extension (e.g., a .jpg extension). The file 206 can then be e-mailed to a hand-held portable device 122 using standard e-mail functions 208. By using the picture file extension, file filtering and blocking features associated with many e-mail systems can be avoided to assure the file 206 reaches the hand-held device 122. Various file extensions, other than a picture file extension, could also be used.

In another implementation, rather than e-mailing the file to the portable hand-held device, the file could be retrieved by the hand-held device directly from a web site, where the export function makes the file available on the web site. Alternatively, all cooking programs could be made available on a web site, in appropriate formats, for selection and download. On such a site, multiple programs for a given food item may be provided for different oven types, with the user entering oven type and the web site offering only the cooking program that is configured for the user's identified oven type.

Referring now to FIG. 2, the operator of the hand-held device 122 (e.g., a service or sales technician associated with the oven manufacturer or the oven end user) can then transmit the cooking programs (and product information for traceability) to the oven controller 150 using the binary file. Specifically, the operator selects a Bluetooth communication function of the hand-held, identifies and selects the oven as the receiving/communicating device for which a link is to be established, and then selects the file for transmission to the oven controller via the established Bluetooth link 210. The oven controller then identifies each of the multiple cooking programs contained in the binary file and stores each of the cooking programs as a separate, selectable cooking program for the oven.

In one implementation, each cooking program stored in the binary file includes an associated cooking program number. The controller operates to overwrite any previously stored cooking program having a cooking program number that is the same as the cooking program number associated with an identified cooking program of the binary file.

In another implementation, each cooking program stored in the binary file includes an associated cooking program identifier (e.g., program number and program name), and the controller operates to overwrite any previously stored cooking program having a cooking program identifier that is the same (i.e., both program number and name) as the cooking program identifier associated with an identified cooking program of the file.

In another implementation, each cooking program stored in the file includes an associated cooking program number, and the controller operates to avoid overwriting any previously stored cooking program having a cooking program number that is the same as the cooking program number associated with an identified cooking program of the file. In this implementation the identified cooking program file may simply be stored as the next available numeric cooking program in memory of the controller or may be stored by program name only without a numeric identifier.

Other types of uploads (e.g., firmware uploads) to the oven controller could be handled in a similar manner using the binary file format with picture file extension (or other extensions).

The Bluetooth communication feature of the oven 100 may be used for other communication operations as well. For example, it may be used to facilitate data retrieval from the oven (e.g. such as service information, fault information, HAACP compliance records etc.). By way of example, a method of retrieving information from a food product cooking oven may involve configuring an information request as a binary file stored with a picture file extension; e-mailing the binary file to a portable hand-held device including Bluetooth communication capability; utilizing the hand-held device, selecting the binary file for transfer to the oven, wherein the oven has Bluetooth communication capability; and transferring the binary file to the oven via the Bluetooth communication link between the oven and the hand-held device; and the oven includes a controller and responsive to receipt of the binary file the controller identifies the information request and transfers the information in a text file format to the hand-held device via the Bluetooth communication link. Other file formats could also be used. This same process could be used for other types of food equipment products/devices (e.g., mixers, slicers, refrigeration, dishwashers, scales or wrappers).

It is to be clearly understood that the above description is intended by way of illustration and example only and is not intended to be taken by way of limitation. Variations are possible.

What is claimed is:

1. An oven, comprising:

a cooking chamber with at least one associated cooking source;

a user interface;

a scanning mechanism for scanning product codes associated with food products to be cooked;

a controller for receiving scanned product code information and connected for (i) receiving input from the user interface and (ii) controlling operation of the cooking source, wherein the controller is configured with a cook ready mode in which the controller will operate such that upon receiving a scanned product code the controller:

(a) will implement a cook preparation sequence associated with the scanned product code, including operating the cooking source to prepare the cooking chamber for cooking and setting a timer to a duration associated with the scanned product code; and (b) will maintain the oven in a ready state, without initiating countdown of the timer, until a start cooking input is received via user actuation of a portion of the user interface.

2. The oven of claim 1 wherein the scanning mechanism is a bar code scanning mechanism and wherein the scanned product code information includes cook program details therein.

3. The oven of claim 1 wherein in the cook ready mode the controller is configured such that upon receiving the scanned product code the controller will identify a stored cooking program associated with the scanned product code and implement the cook preparation sequence for the identified cooking program.

4. The oven of claim 3 wherein the controller is configured such that during the cook preparation sequence the cooking source will be operated to preheat the oven chamber to a specified temperature associated with the scanned product code.

5. The oven of claim 3 wherein the scanning mechanism is one of (i) a bar code scanner configured to communicate scanned product bar code information to the controller or (ii) an RFID tag reader configured to communicate scanned RFID tag code information to the controller.

6. The oven of claim 3 wherein the controller is configured with a cooking program input/modify mode selectable via the user interface, during the cooking program input/modify mode the controller will operate such that:

(i) a display of the user interface will display at least a program link icon in association with a specific cooking program;

(ii) upon user selection of the program link icon the controller will initiate a timeout operation; and (iii) upon receipt of a scanned product code prior to completion of the timeout operation, the scanned product code will be linked, in memory of the controller, to the specific cooking program; and (iv) upon receipt of a scanned product code after completion of the timeout operation, the scanned product code will not be linked to the specific cooking program.

7. The oven of claim 6 wherein in the cooking program input/modify mode the controller is configured to operate such that the display of the user interface will further display a program unlink icon in association with the specific cooking program, and upon user selection of the program unlink icon a link between a scanned product code and the specific cooking program will be eliminated.

8. The oven of claim 7 wherein in the cooking program input/modify mode the controller is configured to operate such that if the specific program is linked with a scanned product code, the scanned product code number will be displayed on the display.

9. The oven of claim 6 wherein in the cooking program input/modify mode the controller is configured to operate such that if the received scanned product code is already linked with another stored cooking program, the controller will operate such that an identifier of the other stored cooking program will be displayed and the scanned product code will not be linked to the specific cooking program.

10. An oven, comprising:

a cooking chamber with at least one associated cooking source;

a user interface;

a scanning mechanism for scanning product codes associated with food products to be cooked;

a controller for receiving scanned product code information and connected for (i) receiving input from the user interface and (ii) controlling operation of the cooking source, wherein the controller is configured with a cook ready mode in which the controller will operate such that upon receiving a scanned product code the controller will identify a stored cooking program associated with the scanned product code;

wherein the controller is configured with a cooking program input/modify mode selectable via the user interface, and during the cooking program input/modify mode the controller will operate such that:

(i) a user activatable program link selection for a specific cooking program will be presented on the user interface;

(ii) upon user activation of the program link selection the controller will initiate a timeout operation;

(iii) upon receipt of a scanned product code prior to completion of the timeout operation, the scanned product code will be linked, in memory of the controller, to the specific cooking program; and (iv) upon receipt of a scanned product code after completion of the timeout operation, the scanned product code will not be linked to the specific cooking program.

11. The oven of claim 10 wherein in the cooking program input/modify mode the controller is configured to operate such that a user activatable program unlink selection for the specific program will be presented on the user interface, and upon user activation of the program unlink selection a link between a scanned product code and the specific program will be eliminated.

12. The oven of claim 10 wherein in the cooking program input/modify mode the controller is configured to operate such that if the specific program is linked with a scanned product code, the scanned product code number will be displayed on a display of the user interface.

13. The oven of claim 10 wherein in the cooking program input/modify mode the controller is configured to operate such that if the received scanned product code is already linked with another stored cooking program, the controller will operate such that an identifier of the other stored cooking program will be displayed on a display of the user interface and the scanned product code will not be linked to the specific cooking program.

14. The oven of claim 10 wherein the scanning mechanism is one of (i) a bar code scanner configured to communicate scanned product bar code information to the controller or (ii) an RFID tag reader configured to communicate scanned RFID tag code information to the controller.

15. An oven, comprising:

a cooking chamber with at least one associated cooking source;

a user interface;

a scanning mechanism for scanning product codes associated with food products to be cooked;

a controller for receiving scanned product code information and connected for (i) receiving input from the user interface and (ii) controlling operation of the cooking source, wherein the controller is programmed such that in a cook ready mode, upon receiving a scanned product code, the controller will operate to:

(a) identify a stored cooking program associated with the scanned product code;

(b) implement a cook preparation sequence for the identified cooking program, including operating the cooking source to preheat the oven chamber to a specified temperature indicated by the identified cooking program to prepare the cooking chamber for cooking and setting a timer to a duration indicated by the identified cooking program; and (c) maintain the oven in a ready state, without initiating countdown of the timer, until a start cooking input is received via user actuation of a portion of the user interface.

16. The oven of claim 15 wherein the controller is programmed to include a cooking program input/modify mode selectable via the user interface, during the cooking program input/modify mode the controller will operate such that:

(i) a display of the user interface will display at least a program link icon in association with a specific cooking program;

(ii) upon user selection of the program link icon the controller will initiate a timeout operation;

(iii) upon receipt of a scanned product code prior to completion of the timeout operation, the scanned product code will be linked, in memory of the controller, to the specific cooking program; and (iv) upon receipt of a scanned product code after completion of the timeout operation, the scanned product code will not be linked to the specific cooking program.

17. The oven of claim 16 wherein the controller is programmed such that in the cooking program input/modify mode the controller will operate such that the display of the user interface will further display a program unlink icon in association with the specific cooking program, upon user selection of the program unlink icon a link between a scanned product code and the specific cooking program will be eliminated.

18. The oven of claim 16 wherein the controller is programmed such that in the cooking program input/modify mode the controller will operate such that if the specific program is linked with a scanned product code, the scanned product code number will be displayed on the display.

19. The oven of claim 16 wherein the controller is programmed such that in the cooking program input/modify mode the controller will operate such that if the received scanned product code is already linked with another stored cooking program, an identifier of the other stored cooking program will be displayed and the scanned product code will not be linked to the specific cooking program.

* * * * *